(No Model.)
W. ASBURY.
TRICYCLE.
No. 285,946. Patented Oct. 2, 1883.
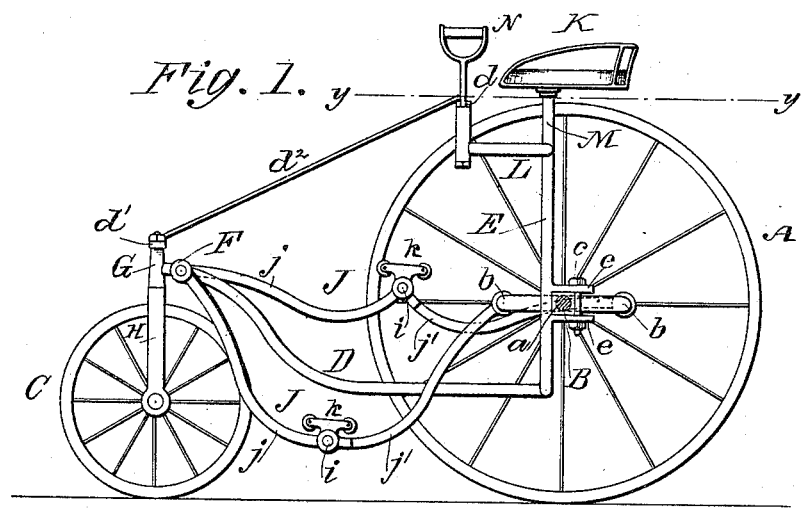
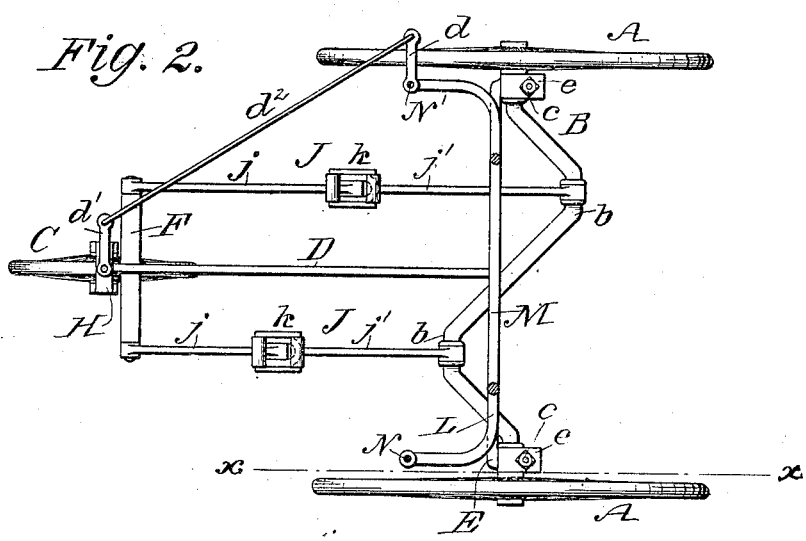
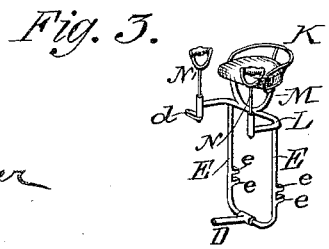
WITNESSES:
INVENTOR:
W. Asbury
BY Munn & Co
ATTORNEYS.

UNITED STATES PATENT OFFICE.

WILLIAM ASBURY, OF BOSTON, MASSACHUSETTS.

TRICYCLE.

SPECIFICATION forming part of Letters Patent No. 285,946, dated October 2, 1883.

Application filed June 22, 1883. (No model.)

*To all whom it may concern:*

Be it known that I, WILLIAM ASBURY, of Boston, in the county of Suffolk and State of Massachusetts, have invented a new and Improved Tricycle, of which the following is a full, clear, and exact description.

My invention relates to certain improvements in tricycles; and it consists of the construction, arrangement, and combination of parts, all as hereinafter described and claimed.

Reference is to be had to the accompanying drawings, forming a part of this specification, in which similar letters of reference indicate corresponding parts in all the figures.

Figure 1 is a sectional elevation of my new and improved tricycle, taken on the line $x\,x$ of Fig. 2. Fig. 2 is a sectional plan view of the same, taken on the line $y\,y$ of Fig. 1; and Fig. 3 is a detailed perspective view of the body-iron, seat-supporting iron, and hand-pieces.

A A are the drive-wheels of the tricycle. These are secured upon the axle B, which is bent to form the opposite cranks, $b\,b$.

C is the small front guide-wheel of the tricycle, and D is the reach, which is secured at its rear end to the body-iron E and at its forward end to the cross-bar F, which is secured to or formed with the vertical sleeve G, in which the yoke-iron H of the front wheel, C, is swiveled.

J J are the jointed pitmen, by which the tricycle is propelled by the feet of the rider while sitting upon the seat K. These pitmen are composed of the forward parts, $j\,j$, which are pivoted to the ends of the cross-bar F, and of the rear parts, $j'\,j'$, which are attached to the cranks $b\,b$ of the bent axle B. In the center the pitmen are hinged, as shown at $i\,i$, and immediately over the pivots they are provided with the pedal pieces $k\,k$, for supporting the feet of the rider, so that in order to propel the tricycle the rider has simply to place his feet upon the pedal pieces $k\,k$ and alternately break down the jointed pitmen in the center, which will cause the axle B and drive-wheels A to be revolved, causing the device to move rapidly and easily over the ground.

The body-iron E is made U-shaped, as shown in Fig. 3, and it is formed with the sets of plates $e\,e$, by which it is attached to the axle B, the plates serving as boxes to receive the journaled blocks $a\,a$, held in place by the bolts $c\,c$, passing through the plates.

To the upper ends of the body-iron E is secured in horizontal position the U-shaped iron L, and upon this iron, in the center, is secured another U-shaped iron, M, vertically arranged for supporting the seat K.

Secured to the forward ends of the iron L are the hand-pieces N and N'. The piece N is rigid, while the piece N' is adapted to turn in a sleeve, and is provided with the crank $d$, which is connected to the crank $d'$ upon the yoke-iron H by the rod $d^2$, so that by turning the hand-piece N' the front wheel, C, may be turned to the right or left for guiding the tricycle. By this arrangement of the hand-pieces N N' they are held in easy reach of the rider while sitting on seat K, so that they serve also as holds or grasps to the rider, so that he may easily throw his weight upon and effectively and easily apply the force of his limbs to the pitmen J J in propelling the device. The pitmen J J being adapted simply to be broken down in the center, and having a vertical movement in the arc described by the ends of the pivoted parts $j\,j$, the movement of the feet of the rider, when force is applied, is downward and slightly outward at the lower end of the stroke, so that the movement is natural and very easy to the rider, and is applied with advantage, so that he is enabled to propel the device with great speed and with comparative ease and comfort. Besides, by this arrangement of the pitmen the tricycle may be started without applying the hands to the drive-wheels, and by the described arrangement of the body-iron E the seat K is held immediately over the axle B, so that the weight of the rider is directly upon the drive-wheels, which causes them to take a firm grip upon the ground, so that there is no danger of the wheels slipping upon the ground. Furthermore, the tricycle has the advantages also of being durable and cheap, and the connections are so arranged that there is no dead-center to overcome in starting the tricycle, and there are no chains to stretch or come unriveted while on a journey, and no cog-wheels to break or jar to the rider, and consequently the extra bearings and friction and expense incident to such devices are dispensed with, and any person skilled or otherwise can put the tricycle together, so that in case any of the parts break they can be supplied from a distance without the machine being sent to the maker.

Having thus described my invention, I claim as new and desire to secure by Letters Patent—

The body-iron E, made U-shaped, and having the U-shaped iron L secured to it for holding the hand-pieces N N', substantially as and for the purpose set forth.

WILLIAM ASBURY.

Witnesses:
 ALFRED PARKER,
 JOHN SCOTT.